Sept. 19, 1933.　　　F. WOOD　　　1,927,511
BEARING HOUSING
Filed June 23, 1932　　2 Sheets-Sheet 1
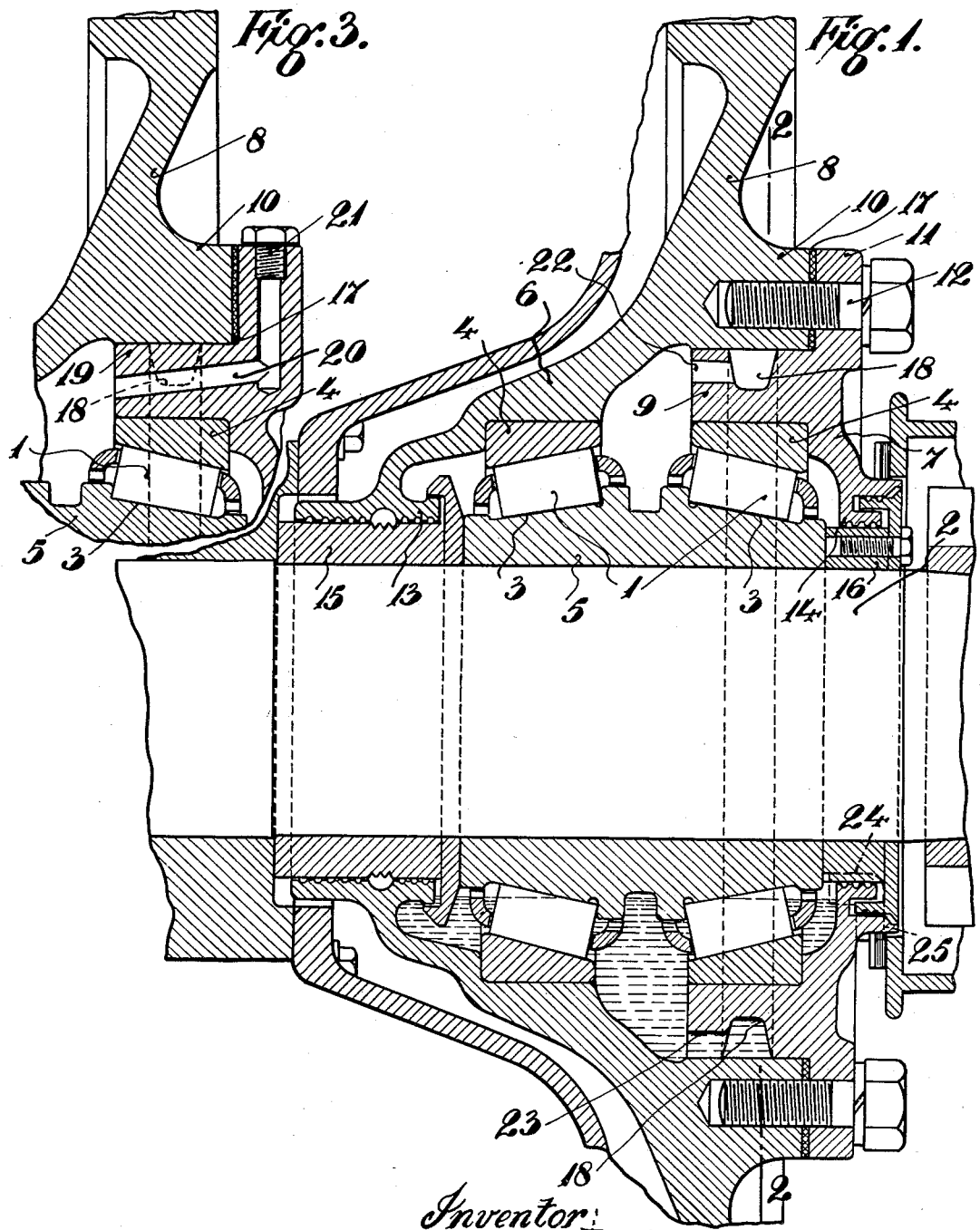
Inventor:
Frederick Wood,
By Carr Carr & Gravely
His Attorneys

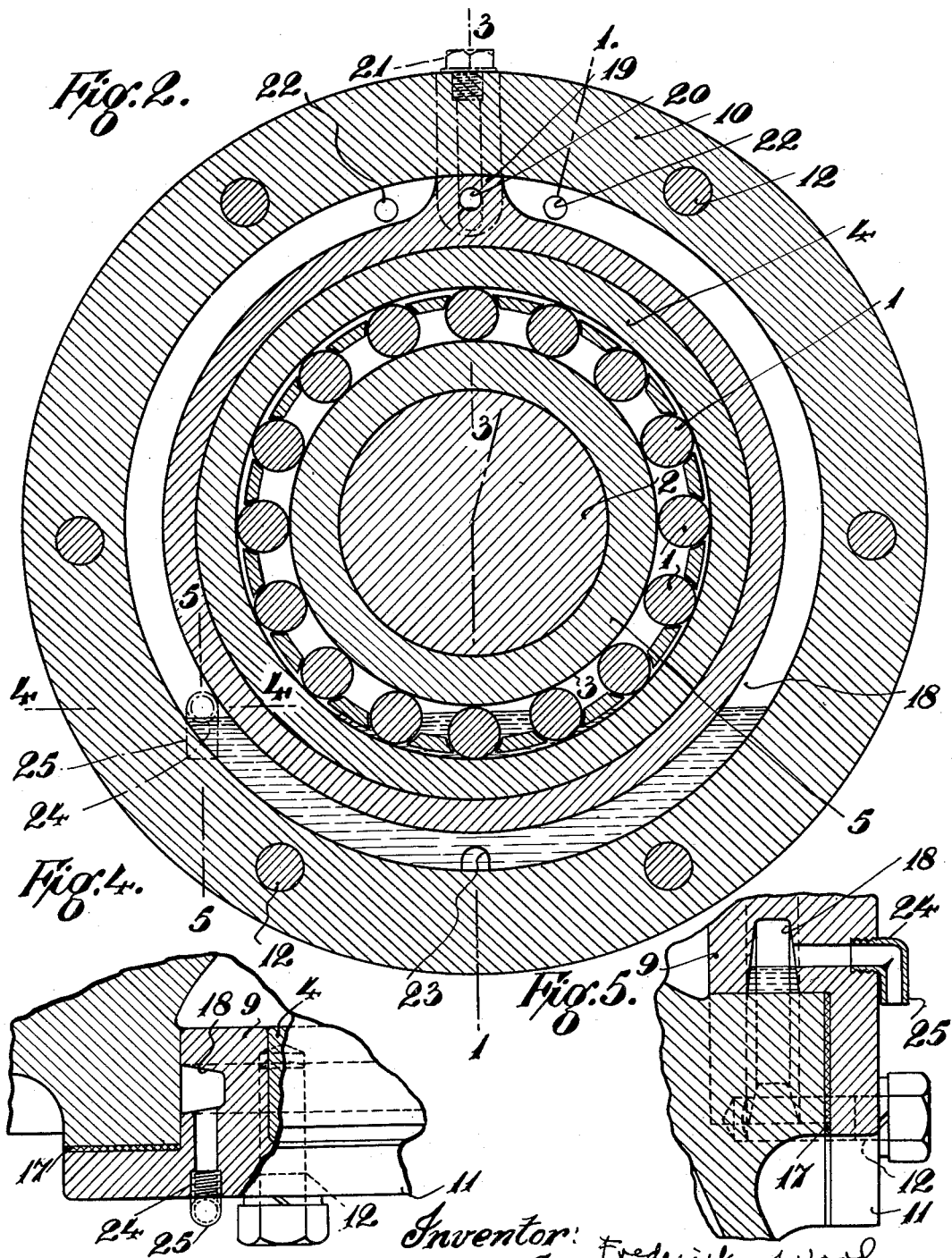

Patented Sept. 19, 1933

1,927,511

UNITED STATES PATENT OFFICE 1,927,511

BEARING HOUSING

Frederick Wood, Birmingham, England, assignor to The Timken Roller Bearing Company, Canton, Ohio, a corporation of Ohio Application June 23, 1932, Serial No. 618,915, and in Great Britain November 21, 1931

6 Claims. (Cl. 308—187)

This invention relates to housings for enclosing ball or roller shaft bearings and adapted to be partly filled with oil into which the balls or rollers, or a part of the bearing, dips, or within which the balls or rollers are immersed, the outer race being carried by an annular supporting member arranged within or forming part of the housing. With constructions of this kind it is found that the heat generated by the moving parts causes the air in the upper or main part of the housing to become heated, with the result that it expands and causes some of the oil to be forced or carried out of the housing. This oil is generally forced or carried out between the shaft and the contacting edges of the housing, and, in the case of a dynamo shaft, the oil is liable to get on to the windings with detrimental results.

The object of the present invention is to avoid the above drawback and to provide suitable means for the escape of the air from the housing as it expands.

The invention consists essentially in the provision of an overflow passage or opening in the housing which prevents the latter from being filled beyond a predetermined level, in combination with an outlet for the air in the upper part of the housing, the said air outlet communicating with the overflow passage or opening by a groove or conduit. The invention is particularly applicable to arrangements in which the bearing is contained within a housing consisting of two detachably connected together parts. This two-part housing is partly filled with oil and both the overflow passage for the oil and the air outlet are conveniently formed in one of the said parts of the housing, the said part being formed with an annular groove around its periphery serving to place the air outlet and overflow passage in communication with one another.

Figure 1 of the accompanying drawings is a vertical longitudinal section through the roller bearing housing employed in connection with an electric motor, and provided with the improved air vent and overflow means, the said section being taken on line 1—1, Figure 2.

Figure 2 is a transverse section on line 2—2, Figure 1.

Figure 3 is a section on line 3—3, Figure 2, through the upper part of the housing, showing the means for filling the housing with oil.

Figure 4 is a horizontal section on line 4—4, Figure 2, through one side of the housing.

Figure 5 is a vertical section on line 5—5, Figure 2.

Referring to the said drawings, the bearing comprises two sets of rollers 1, 1, spaced around the armature shaft 2 at suitable distances apart, the rollers of each set being disposed between inner and outer races 3, 4. The inner races 3, 3, are conveniently formed around the opposite ends of a sleeve 5 which is a press fit on the shaft, but the two outer races 4, 4, on the other hand, are separate members and are carried by the respective portions 6, 7, of a two-part housing, the inner portion 6 conveniently being formed integral with the end cover 8 of the carcase or casing of the motor. The said part 6 of the housing is of bell form, extending inwards from the cover 8, while the outer portion 7 has a cylindrical wall or sleeve 9 on its inner face adapted to fit closely within a cylindrical flange or boss 10 on the inner portion 6 of the housing and being provided with an external flange 11 by which it is detachably connected to an opposed seating surface on the said boss 10 of the inner portion of the housing through the medium of bolts 12. The outer ends of the two parts 6, 7, of the housing terminate in rings or sleves 13, 14, respectively which encircle and fit around collars or sleeves 15, 16, fixed to the shaft which is supported by the bearing. The said two-part housing 6, 7, is partly filled with oil into which the rollers dip or in which they are immersed as they rotate, so that they are thus efficiently lubricated the two parts of the housings being secured closely together by the bolts 12, with suitable packing 17 between the parts 10, 11, in order to prevent the oil from escaping between them, the said packing also serving as an adjusting shim for the bearing.

As the parts rotate the air in the main or upper portion of the housing becomes heated and expands, and if no proper provision is made for the outlet of the air the latter will escape between the outer ends of the housing and the engaging parts on the shaft, carrying some of the oil with it. This oil which is carried or forced out with the air would run on to or be deposited upon the shaft outside the housing, and apart from the waste which would result and the consequential lowering of the oil level, the oil would be liable, in the case of armature shafts, to find its way on to the armature windings. In order to avoid this blowing-out of the oil the wall or sleeve 9 of the outer part 7 of the housing is formed around its outer circumferential periphery with an annular groove or channel 18 which does not, however, extend completely around the circumference of the said sleeve 9, its continuity being interrupted at the upper part of the housing member 7 by a solid part 19 (Figures 2 and 3), the groove terminating upon opposite sides of this solid part, and a filling passage 20, closed by a removable plug 21 (Figure 3), being provided in the said part 19 and in the flange 11 to enable the housing to be filled with oil to the desired level. The groove 18 is closed radially by the overlapping flange or boss 10 of the housing member 6, and it communicates with the upper part of the housing by means of two lateral passages 22, 22, situated near its respective ends, as shown in Figure 2. The said groove 18 also communicates with the housing at or near its lowest point by a lateral passage 23 so that the oil in the lower part of the housing can enter the groove through the said passage, while a horizontal overflow passage 24 extends from one side of the said groove 18 through the housing member 7 to the outside of the housing, its outer end being fitted with an elbow discharge fitting 25. This passage 24 is disposed at a convenient height above the bottom of the housing to ensure the oil in the said housing being at a suitable level for the efficient lubrication of the bearing, and it prevents the housing from being filled above the most suitable level, it being understood that the oil within the housing passes through the passage 23 into the groove 18 within which it rises until it reaches the overflow passage.

As the air inside the housing becomes heated and expands it passes through the passages 22, 22, into the annular groove or conduit 18, and escapes from the latter through the overflow passage 24 into the atmosphere. In this manner the oil is effectively prevented from being forced or carried by the air between the outer ends of the housing and the shaft. Moreover, since the outlet for the air is disposed at the top of the housing very little oil is carried over with the air into the annular groove 18.

Having fully described my invention, what I desire to claim and secure by Letters Patent is:—

1. A bearing housing comprising two connected-together parts having engaging surfaces one of which is provided with a groove closed by the other surface, said groove communicating with the upper part of the interior of the housing by an air vent passage and with the lower part of the interior of the housing by an oil passage and also communicating with the exterior of the housing by an oil overflow passage situated at a higher level than the said oil passage.

2. A bearing housing comprising two end parts one of which has an inwardly-extending annular portion fitting within the other part, one of said end parts having a circumferential groove closed by the engaging portion of the other part, said groove communicating with the interior of the housing by a lateral air vent passage and with the lower portion of the said interior by another lateral passage and with the exterior of the housing by another lateral passage situated at a suitable height to constitute an oil overflow passage.

3. The combination with a shaft, of an inner bearing race member thereon, an outer bearing race member, antifriction rolling elements between the inner and outer race members, and a housing enclosing the race members and rolling elements and adapted to contain oil for lubricating the bearing, said housing comprising two end members one of which has an inwardly-extending annular portion fitting within the other part and supporting the outer race member, said annular portion having in its periphery a circumferential groove closed by the surface of the engaging part and communicating by lateral passages with the upper part of the interior of the housing, with the lower part of the interior of the housing, and with the exterior of the housing, the passage that communicates with the exterior of the housing being at a suitable height to constitute an oil overflow passage.

4. The combination with a shaft of an inner bearing race member thereon, an outer bearing race member, antifriction rolling elements between the inner and outer race members, and an oil-containing housing comprising a main end part and a detachable closure part secured thereto, said closure part having an inwardly-extending annular portion fitting within the main part and supporting the outer race and being provided around its outer circumference with a groove closed by the engaging portion of the said main part and having its continuity interrupted at the top by a solid part situated between the ends of the groove and provided with a filling passage leading from the outside to the inside of the housing, the said groove communicating by lateral passages with the upper part of the interior of the housing, with the lower part of the interior of the housing and with the exterior of the housing, the passage that communicates with the exterior of the housing being at a suitable height to constitute an oil overflow passage.

5. A horizontal shaft, a bearing for the shaft, a tight housing enclosing the shaft bearing, an oil overflow passage in the housing leading directly to the atmosphere and disposed above the lowest part of the bearing, so that the latter may dip into the oil, and an air vent in the upper part of the housing separate from said overflow passage and having unrestricted communication with the oil overflow passage.

6. A bearing housing provided in its body with an enclosed circumferential conduit having branch passages opening directly into the upper part of the interior of the housing and into the lower part of the interior of the housing respectively, and having a branch passage opening into the atmosphere and constituting an air vent and an oil overflow passage.

FREDERICK WOOD.